United States Patent
Van Oost et al.

(10) Patent No.: US 10,251,028 B2
(45) Date of Patent: Apr. 2, 2019

(54) METHOD FOR CONTROLLING A WIRELESS LINK IN A LOCAL AREA NETWORK INCLUDING A WIRELESS BRIDGE, RESPECTIVE WIRELESS BRIDGE, PROGRAM STORAGE MEDIUM AND COMPUTER PROGRAM

(71) Applicant: INTERDIGITAL CE PATENT HOLDINGS, Paris (FR)

(72) Inventors: Koen Van Oost, Borsbeek (BE); Stijn Segers, Lint (BE); Frederik Verwaest, Mol (BE)

(73) Assignee: INTERDIGITAL CE PATENT HOLDINGS, Paris (FR)

(*) Notice: Subject to any disclaimer, the term of this patent is extended or adjusted under 35 U.S.C. 154(b) by 0 days.

(21) Appl. No.: 15/382,720

(22) Filed: Dec. 18, 2016

(65) Prior Publication Data
US 2017/0181217 A1    Jun. 22, 2017

(30) Foreign Application Priority Data
Dec. 18, 2015  (EP) .................................... 15307052

(51) Int. Cl.
*H04B 7/00*        (2006.01)
*H04W 4/06*        (2009.01)
(Continued)

(52) U.S. Cl.
CPC .............. *H04W 4/06* (2013.01); *H04L 12/189* (2013.01); *H04W 76/19* (2018.02);
(Continued)

(58) Field of Classification Search
CPC ... H04W 76/02; H04W 76/028; H04W 88/04; H04W 88/10; H04W 92/08; H04W 92/10
(Continued)

(56) References Cited

U.S. PATENT DOCUMENTS 5,835,721 A * 11/1998 Donahue ................. H04L 29/06
                                                                    709/224
8,234,547 B2    7/2012 Li et al.
(Continued)

FOREIGN PATENT DOCUMENTS

EP          1646182        4/2006
WO       WO2009129367     10/2009

OTHER PUBLICATIONS

Santos et al., "On the Design of Robust and Adaptive IEEE 802.11 Multicast Services for Video Transmissions", 2013 IEEE 14th International Symposium on World of Wireless, Mobile and Multimedia Networks, Madrid, Spain, Jun. 4, 2013, pp. 1-6.
(Continued)

*Primary Examiner* — Dmitry Levitan
(74) *Attorney, Agent, or Firm* — Joseph J. Opalach

(57) ABSTRACT

A method for operating a wireless link in a local area network is described. The wireless link includes a LAN access point, a wireless bridge linked with the LAN access point and a receiver linked with the wireless bridge. The wireless bridge includes a bridge access point and a bridge station. A multicast data connection is established between the LAN access point and the receiver via the wireless bridge by forwarding a multicast data stream, received by the bridge access point from the LAN access point, to the bridge station, restoring the wireless link after a connection loss of the wireless link, and sending a query message by the bridge station to the receiver, when the wireless link is restored.

15 Claims, 3 Drawing Sheets

(51) Int. Cl.
*H04L 12/18* (2006.01)
*H04W 76/19* (2018.01)
*H04W 84/12* (2009.01)

(52) U.S. Cl.
CPC ...... *H04L 12/1836* (2013.01); *H04L 12/1863* (2013.01); *H04W 84/12* (2013.01)

(58) Field of Classification Search
USPC ................ 370/310, 312, 315, 433, 449, 463
See application file for complete search history.

(56) References Cited

U.S. PATENT DOCUMENTS

| | | | | |
|---|---|---|---|---|
| 8,374,113 | B2* | 2/2013 | Meier | H04W 4/06 370/312 |
| 8,427,938 | B2* | 4/2013 | Atreya | G06F 11/2023 370/217 |
| 8,761,069 | B2* | 6/2014 | Banerjea | H04L 12/1877 370/312 |
| 9,081,729 | B2* | 7/2015 | Adam | G06F 11/1443 |
| 9,055,037 | B2 | 9/2015 | Evans et al. | |
| 2010/0293043 | A1 | 11/2010 | Atreya et al. | |

OTHER PUBLICATIONS

Cano et al., "Scheduling feedback for scalability and reliability in a streaming multicast protocol", 2015 IEEE World Conference on Factory Communication Systems, Palma de Mallorca, Spain, May 27, 2015, pp. 1-8.

\* cited by examiner

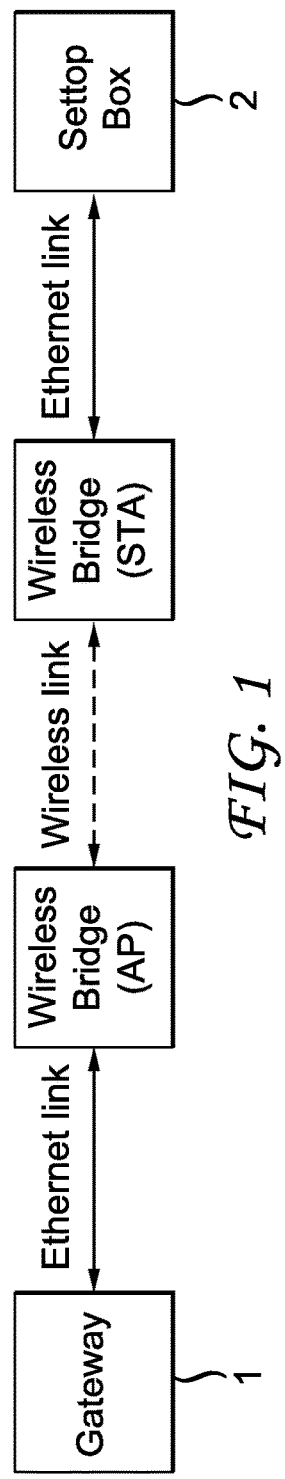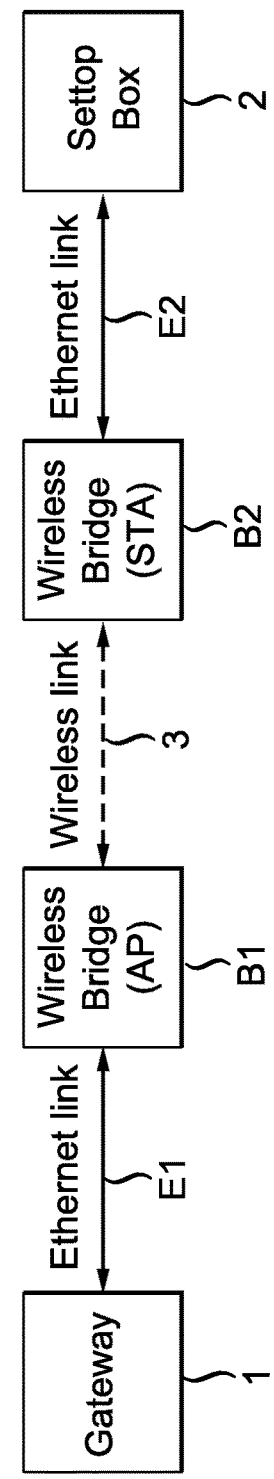

METHOD FOR CONTROLLING A WIRELESS LINK IN A LOCAL AREA NETWORK INCLUDING A WIRELESS BRIDGE, RESPECTIVE WIRELESS BRIDGE, PROGRAM STORAGE MEDIUM AND COMPUTER PROGRAM

REFERENCE TO RELATED EUROPEAN APPLICATION

This application claims priority from European Application No. 15307052.9, entitled "METHOD FOR CONTROLLING A WIRELESS LINK IN A LOCAL AREA NETWORK INCLUDING A WIRELESS BRIDGE, RESPECTIVE WIRELESS BRIDGE, PROGRAM STORAGE MEDIUM AND COMPUTER PROGRAM," filed on Dec. 18, 2015, the contents of which are hereby incorporated by reference in its entirety.

TECHNICAL FIELD

The disclosure relates to the field of customer premises equipment devices being coupled via a digital subscriber line to a service provider delivering broadband services to a customer, and more specifically, to the area of wireless multicast video distribution within a network.

BACKGROUND

Access gateways are widely used to connect devices in a home of a customer or devices of an enterprise to the Internet or to any other wide area networks (WAN). Access gateways use for example digital subscriber line (DSL) that enables a high data rate transmission over copper lines, or use optical fiber technology. Network operators, e.g. Network service providers (NSP), are managing a large amount of access gateways, and also other devices such as routers, switches, repeaters, wireless bridges and telephones, which are understood in this context as customer premises equipment (CPE) devices.

Access gateways including wireless technology have a key role in today's home and professional environments. A mechanism for connecting wireless devices to a local area network (LAN) is called Wi-Fi, which is a brand name of the Wi-Fi Alliance for devices using the IEEE 802.11 family of standards for wireless data transmission. The IEEE 802.11 standards define two types of wireless nodes, a general wireless device that can connect to other devices called a station (denoted as STA) and a special type of a STA that is in control of the network, namely an access point (denoted AP). A Wi-Fi network, often called a WLAN (wireless local area network), consists of an AP with one or several STA connected to the AP.

Video streaming is more and more used within LANs and WLANs, for example, for using Internet Protocol TV (IPTV). For streaming video to several end-devices, in particular multicast streaming is used, as defined by the Internet Group Management Protocol (IGMP). Providing multicast video over a wireless transmission is unreliable and has a low maximum throughput due to the definition of multicast handling in IEEE 802.11.

To extend the range of an access gateway, wireless bridges and repeaters are known. An in-house wireless video distribution system consists in an embodiment, as depicted in FIG. 1, of an access gateway 1 being connected via an Ethernet link with a wireless bridge including a bridge access point and a bridge station. The bridge station is connected via an Ethernet link with a receiver 2, e.g. a set-top box (STB). The wireless bridge is for example a video bridge in accordance with an IEEE 802.11 standard.

The receiver 2 subscribes to a video stream by sending an IGMP join message upstream via the access gateway 1 to an Internet service provider (ISP). This join message is snooped by the wireless bridge and by the access gateway 1. When received from the ISP, the access gateway 1 starts to forward the multicast video stream to the bridge access point which in turn forwards it (using unicast on layer 2) to the bridge station and further to the receiver 2. Only if an IGMP join message was seen for a certain multicast group from a specific client, the multicast stream is forwarded to that client. Hence, for all wireless devices intended to transmit multicast video over wireless, it is needed to perform a multicast to unicast conversion.

Due to the nature of the communication medium that is used, a wireless link is more easily broken than a wired link. In case of a connection loss of the wireless link, and when the wireless link is restored between the bridge access point and the bridge station, the receiver 2 has to request the multicast data stream again. Because the Ethernet links did not go down, after the connection loss of wireless link 3 and the reestablishment, no specific action is triggered in the access gateway 1 and the receiver 2. The access gateway 1 will lose all it's learnt multicast groups for that client, as it clears its connection table upon disconnection.

As a result, the multicast video stream is not restored when the client is connected again and a user interaction is needed to play the video again (e.g. to zap to same channel) or the user has to wait until the system refreshes the multicast group subscriptions (it does this periodically), so that an additional delay of the video playback is caused after restoring of the wireless link.

A gateway for a reliable multicast wireless video transmission is described in U.S. Pat. No. 8,374,113.

SUMMARY

The method for operating a wireless link in a local area network including a LAN access point, a wireless bridge linked with the LAN access point and a receiver linked with the wireless bridge, wherein the wireless bridge includes a bridge access point and a bridge station for providing the wireless link, and a multicast data connection is established between the LAN access point and the receiver via the wireless bridge, comprises: forwarding a multicast data stream, received by the bridge access point from the LAN access point, to the bridge station, restoring the wireless link after a connection loss of the wireless link, and sending a query message by the bridge station to the receiver, when the wireless link is restored. The query message is sent in particular immediately by the bridge station to the receiver, without a pause, after the wireless link is restored, so that the multicast data connection is reestablished as soon as possible.

In an aspect of the disclosure, the query message and the join request message are messages in accordance with an Internet Group Management Protocol.

In a preferred embodiment, the video receiver is a set-top box, a satellite receiver or a television set, and the data stream is a video stream.

The wireless bridge includes a bridge access point with a first microprocessor and a bridge station with a second microprocessor, which are configured to perform the method.

A computer program comprises executable program code for performing a method.

A non-transitory program storage medium, being readable by a computer, comprises executable program code for performing the method.

BRIEF DESCRIPTION OF THE DRAWINGS

Preferred embodiments of the disclosure are explained in more detail below by way of example with reference to schematic drawings, which show:

FIG. 1 an access gateway being connected via a wireless bridge with a receiver,

FIG. 2 an access gateway being connected via a wireless bridge with a receiver performing a method according to the present principles, FIG. 3 the wireless bridge of FIG. 2 in more detail, FIG. 4 a flow chart illustrating a method for operating a wireless link in a local area network, and FIG. 5 a local area network including a wireless repeater being coupled between a bridge access point and a bridge station.

DETAILED DESCRIPTION OF PREFERRED EMBODIMENTS

Figure 3:
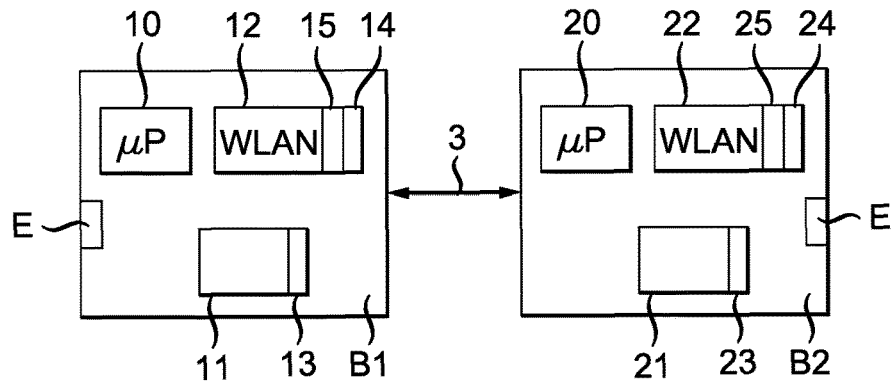

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for instructional purposes to aid the reader in understanding the principles of the disclosure and the concepts contributed by the inventors to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In the following description, example methods for controlling a wireless link in a local area network (LAN) including a LAN access point and a wireless bridge are described, as well as a respective wireless bridge performing the methods. The LAN access point is in particular a CPE device being coupled via a digital subscriber line to a service provider delivering broadband services to a customer. For purposes of explanation, various specific details are set forth in order to provide a thorough understanding of preferred embodiments. It will be evident, however, to one skilled in the art that the present principles may be practiced without these specific details.

The LAN includes in an embodiment, as depicted in FIG. 2, an access gateway 1, representing the LAN access point, which is connected via an Ethernet link E1 to a wireless bridge and at least one receiver 2. The wireless bridge consists of a bridge access point B1 and a bridge station B2 providing a wireless link 3. The receiver 2 is in particular a video receiver, for example a set-top box, a satellite receiver or a television set. The bridge station B2 and the receiver 2 are connected via a second Ethernet link E2. The wireless bridge is for example a video bridge in accordance with an IEEE 802.11 standard. The LAN is for example a home network of an end-user, or any network of an enterprise, administration, etc.

In another embodiment of the invention, the bridge access point B1 is embedded in the gateway 1 and the bridge station B2 is embedded in the receiver 2.

Some details of the video bridge of FIG. 2 are schematically depicted in FIG. 3: The bridge access point B1 and the bridge station B2 are linked via the wireless link 3. The bridge access point B1 includes a circuit comprising a microprocessor 10, a memory 11, a wireless node 12 for the wireless link 3, an operating system 13 stored in the memory 11 and an Ethernet port E. The station B2 includes a second circuit comprising a microprocessor 20, a memory 21, a wireless node 22 for the wireless link 3, an operating system 23 stored in the memory 21 and an Ethernet port E. The wireless node 12 includes a physical layer 14 and a link layer 15, and the wireless node 22 includes a physical layer 24 and a link layer 25.

Figure 4:
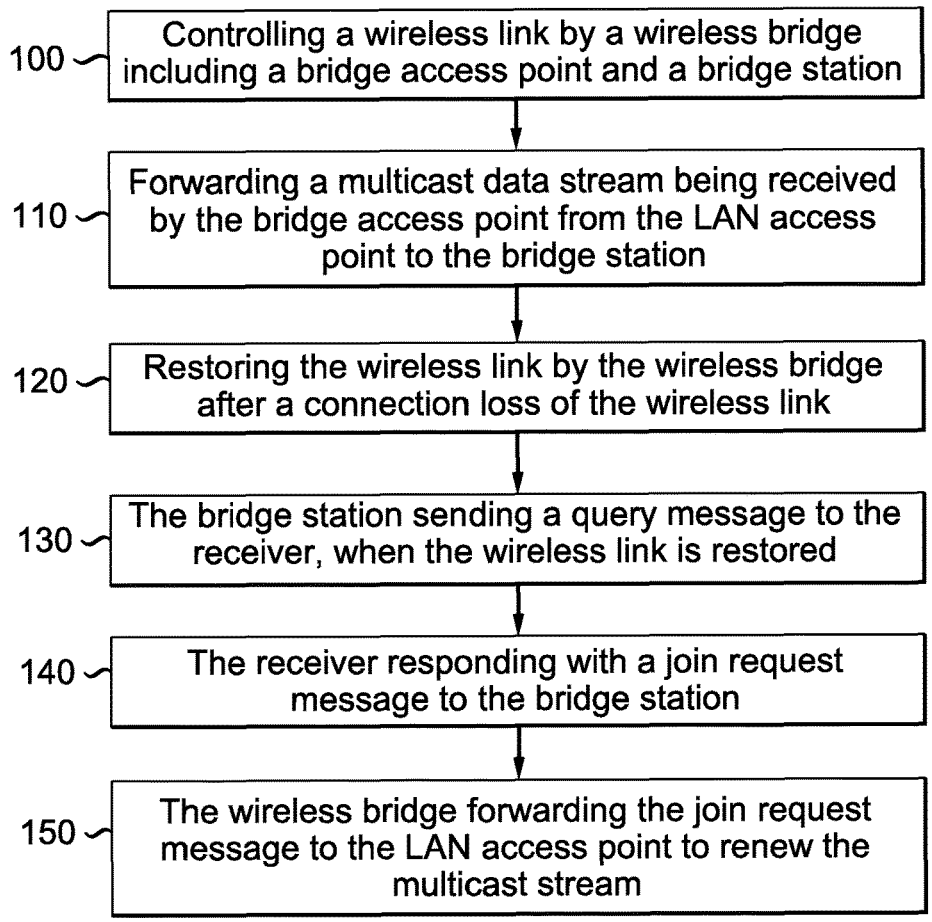

In an embodiment, the method for operating a wireless link, established by a wireless bridge comprising a bridge access point B1 and a bridge station B2, as described with regard to FIG. 2, is depicted in FIG. 4. The wireless link 3 is controlled by the wireless bridge including the bridge access point B1 and the bridge station B2, 100. The wireless bridge B1, B2 forwards a multicast data stream, as received by the access point 1, to the receiver 2 via the wireless link 3, 110. The multicast data stream is requested by the receiver 2 by using an IGMP join request message, which is snooped by the wireless bridge B1, B2.

In case of a connection loss of the wireless link 3, the multicast data stream is interrupted and the access point 1 will remove the receiver 2 from the multicast list. The wireless link 3 is interrupted for example because of a strong interference signal, or the bridge station B2 is moved out of the range of the bridge access point B1.

As soon as the condition causing the interruption of the connection loss of the wireless link 3 has been removed, the wireless link 3 is restored between the wireless access point B1 and the bridge station B2, 120. The wireless bridge knows that a multicast data stream was running from the access gateway 1 to the receiver 2 before the wireless link was interrupted because of the IGMP snooping, and the bridge station B2 therefore sends immediately a query message to the receiver 2, 130. The receiver 2 then responds to the query message with a join request message to the bridge station B2, to reestablish the multicast data stream, 140. The bridge station B2 forwards then the join request message of the receiver 2 to the access gateway 1 via the bridge access point B1 to renew the multicast data stream, 150.

In case the receiver 2 is no longer interested in the multicast data stream, after the wireless link 3 is restored, then the receiver 2 does not respond to the join request message of the bridge station B2, so that the multicast data stream is only reestablished, if still required, to not load the wireless link 3, if needed.

The multicast data stream is for example a multicast video stream and the receiver a television receiver, or a set-top box. The television receiver therefore resumes the rendering of the video, as soon as the multicast video stream is reestablished, so that the interruption of the multicast video stream, caused by the interruption of the wireless link 3, is kept as short as possible. No actions have to be provided by a user of the television set, or by the television set itself, because the television set does not know when the wireless link 3 is reestablished.

Figure 5:
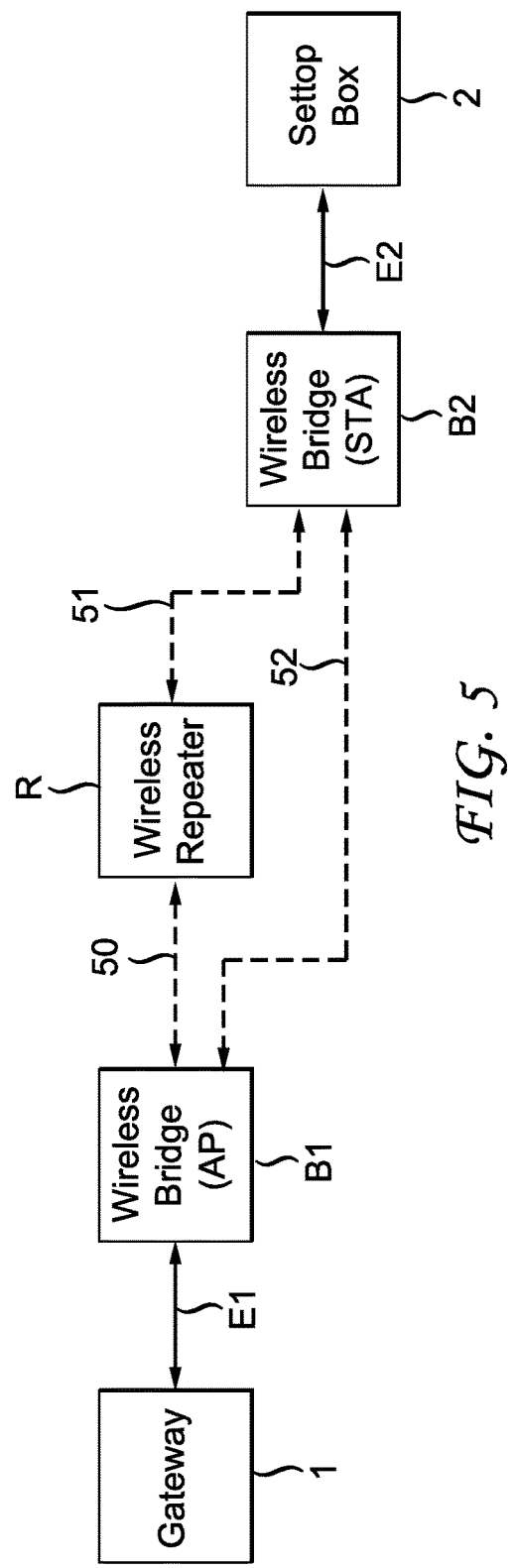

In another embodiment, a wireless repeater R is included in the LAN between the bridge access point B1 and the bridge station B2, as illustrated in FIG. 5. With the wireless repeater R, the range of the bridge access point B1 can be extended. A multicast data stream can be transmitted in this embodiment via the gateway 1, the bridge access point B1, the wireless repeater R and the bridge station B2 to the receiver 2, by using a wireless link 50 between the bridge access point B1 and the wireless repeater R and a wireless link 51 between the wireless repeater R and the bridge station B2. In case of a connection loss and a subsequent connection recovery of the wireless link 50 or the wireless link 51, the bridge station B2 operates as described with regard to FIG. 4. After the wireless link between the bridge access point B1 and the bridge station B2 is reestablished, the bridge station B2 sends immediately a query message to the receiver 2, to renew the multicast data stream for the receiver 2.

If the bridge station B2 is moved to another location within the LAN, for example closer to the bridge access point B1, it may be advantageous to establish a wireless link 52 directly between the bridge access point B1 and the bridge station B2. Also in this case, the bridge station B2 sends a query message immediately to the receiver 2, when the wireless link 52 is established, to continue with the multicast data stream. With the wireless repeater R, the bridge station B2 can now roam from the bridge access point B1 to the wireless repeater R, and vice versa. In each case, the multicast data stream immediately reestablished, as soon as the wireless link 51 or 52 is reestablished.

The described methods have the advantage, that the multicast data stream is only reestablished, if the receiver 2 is still interested in the multicast data stream. The multicast data stream is reestablished in a very short time after the wireless link 3 is restored by the wireless bridge, so that no action from the receiver 2 or the user is required to restore the multicast data stream.

Also other embodiments may be utilized by one skilled in the art without departing from the scope of the present disclosure. The disclosure resides therefore in the claims herein after appended.

The invention claimed is:

1. A method for operating a wireless link in a local area network (LAN) including a LAN access point, a wireless bridge linked with the LAN access point and a receiver linked with the wireless bridge, the wireless bridge including a bridge access point and a bridge station providing the wireless link therebetween, wherein a multicast data connection is established between the LAN access point and the receiver via the wireless bridge, comprising:

recieving by the bridge station, through the wirelss link, a multicast data stream from the LAN access point, and sending a query message by the bridge station to the receiver when the wireless link is restored after a connection loss of the wireless link, for triggering a transmission, by the receiver, of a join request message to renew the multicast stream.

2. The method of claim 1, comprising:

sending the query message by the bridge station to the receiver immediately, without a pause, after the wireless link is restored.

3. The method of claim 1, comprising: receiving the join request message from the receiver in the bridge station to renew the multicast stream.

4. The method of claim 1 wherein the query message and the join request message are messages in accordance with an Internet Group Management Protocol (IGMP).

5. The method of claim 1, wherein a wireless repeater is included in the local area network being configured to provide a first wireless link between the bridge access point and the wireless repeater and a second wireless link between the repeater and the bridge station, the method comprising:

receiving by the bridge station a multicast data stream from the LAN access point, via the repeater, and sending a query message by the bridge station to the receiver, when the at least one of the first and second wireless links is restored after a connection loss of the at least one of the first and second wireless links, for triggering a transmission, by the receiver, of a join request message to renew the multicast stream.

6. The method of claim 1, wherein the data stream is a video stream, the wireless bridge is a video bridge and the receiver is a video receiver.

7. The method according to claim 6, wherein the video receiver is a set-top box, a satellite receiver or a television set.

8. A bridge station comprising:
a microprocessor and a memory, wherein the microprocessor is configured to
receive a multicast data stream from a LAN access point, and send a query message by the bridge station to a receiver when a wireless link between the bridge station and a bridge access point is restored after a connection loss of the wireless link, for triggering a transmission, by the receiver, of a join request message to renew the multicast stream.

9. The bridge station of claim 8, wherein the query message is sent by the bridge station to the receiver immediately, without a pause, after the wireless link is restored.

10. The bridge station of claim 8, wherein the join request message from the receiver to renew the multicast stream is received in the bridge station.

11. The bridge station of claim 8, wherein the query message and the join request message are messages in accordance with an Internet Group Management Protocol (IGMP).

12. The bridge station of claim 8, configured to
receive a multicast data stream, from the LAN access point via a repeater, and
send a query message to a receiver, when the at least one of a first wireless link between the repeater and a bridge access point and a second wireless link between the repeater and the bridge station is restored after a connection loss of the at least one of the first and second wireless links, for triggering a transmission, by the receiver, of a join request message to renew the multicast stream.

13. The bridge station of claim 8, wherein the data stream is a video stream, the bridge station is a video bridge and the receiver is a video receiver.

14. The bridge station of claim 13, wherein the video receiver is a set-top box, a satellite receiver or a television set.

15. A non-transitory program storage medium, readable by a microprocessor and comprising executable program code for:
receiving by a bridge station, through a wireless link, a multicast data stream, from a LAN access point, and
sending a query message by the bridge station to a receiver when the wireless link is restored after a connection loss of the wireless link, for triggering a transmission, by the receiver, of a join request message to renew the multicast stream.

* * * * *